(12) United States Patent
Hamada et al.

(10) Patent No.: US 7,568,826 B2
(45) Date of Patent: *Aug. 4, 2009

(54) BACKLIGHT AND LIQUID CRYSTAL DISPLAY DEVICE

(75) Inventors: Tetsuya Hamada, Kawasaki (JP); Toshihiro Suzuki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/974,577

(22) Filed: Oct. 15, 2007

(65) Prior Publication Data

US 2008/0049448 A1 Feb. 28, 2008

Related U.S. Application Data

(63) Continuation of application No. 10/830,780, filed on Apr. 23, 2004.

(30) Foreign Application Priority Data

Dec. 26, 2003 (JP) .............................. 2003-435415

(51) Int. Cl.
*F21V 8/00* (2006.01)
(52) U.S. Cl. ...................... 362/612; 362/613; 362/231; 362/249.06
(58) Field of Classification Search ................ 362/231, 362/612, 613, 615, 249.02, 249.06; 349/61, 349/62
See application file for complete search history.

(56) References Cited

U.S. PATENT DOCUMENTS

| 4,975,808 | A  | 12/1990 | Bond et al. |
| 6,288,700 | B1 | 9/2001  | Mori |
| 6,753,661 | B2 | 6/2004  | Muthu et al. |
| 6,854,854 | B2 | 2/2005  | Hoelen et al. |
| 2002/0048165 | A1 | 4/2002 | Taniguchi et al. |
| 2002/0175621 | A1 | 11/2002 | Song et al. |
| 2002/0175632 | A1 | 11/2002 | Takeguchi |

(Continued)

FOREIGN PATENT DOCUMENTS

JP A-9-185055 7/1997

(Continued)

OTHER PUBLICATIONS

Taiwanese Office Action dated Jun. 7, 2007 and English language translation thereof.

*Primary Examiner*—Thomas M Sember
(74) *Attorney, Agent, or Firm*—Greer, Burns & Crain, Ltd.

(57) ABSTRACT

A backlight device including a light guide plate having an upper surface configured to face a liquid crystal panel, a lower surface, and at least one side surface extending in a thickness direction between the upper surface and the lower surface. The backlight device also includes a plurality of LEDs for irradiating light beams to the side surface of the light guide plate, which side surface serves as a light incidence surface. The plurality of LEDs are arranged in a plurality of rows in the thickness direction of the same side surface of the light guide plate so as to extend in a longitudinal direction of the light incidence surface. Additionally, of the plurality of LEDs, two LEDs that are electrically connected to each other in series are disposed in different rows.

3 Claims, 16 Drawing Sheets

U.S. PATENT DOCUMENTS

| | | |
|---|---|---|
| 2003/0043567 A1 | 3/2003 | Hoelen et al. |
| 2004/0004424 A1 | 1/2004 | Sakurai |
| 2004/0027067 A1 | 2/2004 | Song et al. |
| 2004/0109664 A1 | 6/2004 | Ohtsuki et al. |
| 2004/0120136 A1 | 6/2004 | Olczak et al. |
| 2005/0035939 A1 | 2/2005 | Akiyama |

FOREIGN PATENT DOCUMENTS

| | | |
|---|---|---|
| JP | 11-260134 | 9/1999 |
| JP | 2000-030521 | 1/2000 |
| JP | 2000-268619 | 9/2000 |
| JP | 2001-76525 | 3/2001 |
| JP | 2001-135118 | 5/2001 |
| JP | A-2001-174816 | 6/2001 |
| JP | 2002-270020 | 9/2002 |
| JP | A-2002-350846 | 12/2002 |
| JP | A-2003-187622 | 7/2003 |
| JP | 2003 330017 | 11/2003 |
| KR | 1998-076384 | 11/1998 |
| KR | 2002-0041480 | 6/2002 |
| KR | 2002-89785 | 11/2002 |
| KR | 2003-0058106 | 7/2003 |
| KR | 2003-0079777 | 10/2003 |
| TW | 200401922 A | 2/2004 |

BACKLIGHT AND LIQUID CRYSTAL DISPLAY DEVICE

This is a continuation of application Ser. No. 10/830,780, filed Apr. 23, 2004.

BACKGROUND OF THE INVENTION

1. Field of the Invention

This invention relates to a side-light type backlight, including a light source which includes LEDs and a light guide plate, and a liquid crystal display device.

2. Description of the Related Art

Backlights used conventionally for a liquid crystal display device can be classified into a side-light type backlight in which a light source is arranged on an end surface side of a light guide plate and a just-below type backlight in which a light source is arranged just below a liquid crystal panel. The side-light type backlight has mainly been used for liquid crystal display devices having a size of about 20 inches or below, particularly for liquid crystal display devices requiring a reduced thickness.

In either system, a cold cathode-ray tube has been used for the light source. LEDs are being used, at present, for compact display sizes such as portable cellular telephones and PDAs because much light power is not required and LEDs are suitable for reducing the size and the weight.

The cold cathode-ray tube is predominant in the liquid crystal display devices having a greater display size than those of the cellular telephones and the PDA. However, the problem of protecting the environment has been taken seriously and the use of the cold cathode-ray tube, which uses mercury, is not desirable. Therefore, various light sources such as mercury-free florescent tubes, LEDs, and so forth have been developed to replace the cold cathode-ray tube. Among them, LEDs are very promising as a light source for next generation devices.

The side light type backlight including the LEDs is described in Japanese Unexamined Patent Publications (Kokai) No. 2001-174816 and No. 2002-350846, for example. The former patent reference 1 teaches to arrange red, blue and green rod-like light sources along a periphery of a light guide plate. The latter patent reference 2 teaches to use four colors of LEDs, that is, white, red, blue and green LEDs.

When the LEDs are used as the light source in the side light type backlight, there may be the case where a plurality of white LEDs are arranged along one or a plurality of sides of a light guide plate and the case where a plurality of red LEDs (R-LEDs), a plurality of green LEDs (G-LEDs) and a plurality of blue LEDs (B-LEDs) are arranged along one or a plurality of sides of the light guide plate to create the white color. The following problems occur at this time.

(a) To secure the amount of light in the light guide plate and uniformity of chromaticity. When a plurality of LEDs are arranged along one side of the light guide plate, these LEDs are arranged with a certain interval among them. Therefore, regions where light is absent appear at portions close to the light incidence surface and, as the distance increases, light mixes with light from the neighboring LEDs, and light becomes uniform at a position away from the light incidence surface.

(b) Drop of light emission efficiency due to heat generation of the LEDs and variation among the LEDs. The LEDs are preferably cooled because light emission efficiency drops with heat generation. Light emission efficiency is different among the R-LEDs, the G-LEDs and the B-LEDs depending on the temperature, and the R-LEDs are most susceptible to the influences of the temperature. Unless a LED is satisfactorily cooled, non-uniformity of the amount of light and non-uniformity of color occur.

(c) To secure reliability. When the LEDs are used at a certain temperature for a long time, light emission efficiency drops. The drop of light emission efficiency is also different among the R-LEDs, the G-LEDs and the B-LEDs. Therefore, there is the case where non-uniformity of the amount of light and non-uniformity of colors appear after the use for thousands of hours. There is the possibility that deterioration of any LEDs among a plurality of LEDs results in non-uniformity of the amount of light and non-uniformity of colors when a plurality of LEDs are used.

(d) To improve efficiency. To obtain the amount of light equivalent to that of the cold cathode-ray tube by using the LEDs, a large number of LEDs are necessary. This results in the increase in the cost and consumed power. Therefore, a plurality of LEDs must be utilized efficiently.

SUMMARY OF THE INVENTION

It is an object of the present invention to provide a backlight that can eliminate color non-uniformity and brightness non-uniformity and can have a high light-emission efficiency, and a liquid crystal display device using the backlight.

A side-light type backlight, according to the present invention, comprises a light source including a plurality of LEDs, a light guide plate, at least one of end surfaces of the light guide plate being a light incidence surface at which a plurality of R-LEDS, a plurality of G-LEDs and a plurality of B-LEDs are arranged, wherein the plurality of LEDs satisfy the relationship of: a distribution range of light emitted from G-LEDs<a distribution range of light emitted from R-LEDs or a distribution range of light emitted from G-LEDs<a distribution range of light emitted from B-LEDs.

According to this construction, when a plurality of R-LEDs, a plurality of G-LEDs and a plurality of B-LEDs are used, the number of G-LEDs is the greatest, to provide the white balance, and the number of B-LEDs is the smallest. Therefore, the interval between two B-LEDs is extended in the case of the B-LEDs having the smallest number, and the color does not mix unless the positions are away from the light incidence surface of the light guide plate (blue brightness does not become uniform). Therefore, the distribution range of light outgoing from the B-LEDs must be greater than the distribution range of light outgoing from the G-LEDs and the distribution range of light outgoing from the R-LEDs. However, there may be a case where the numbers of the B-LEDs and the B-LEDs must satisfy not only the relationship of: B-LEDs<R-LEDs but also B-LEDs>R-LEDs. In such a case, the distribution ranges of light are so set as to satisfy the relationship of: G-LEDs<B-LEDs<R-LEDs.

When the light of one B-LED is made incident into the light guide plate and diverges in the light guide plate, the position at which the light starts intersecting light of an adjacent B-LED is farther than the positions of R-LED and G-LED at which they similarly start intersecting. However, because the distribution range of the B-LEDs is wider than the distribution ranges of the R-LEDs and G-LEDs, the difference between the intensity of divergent light and the intensity of light traveling straight in the light guide plate is smaller than that of the R-LEDs and the G-LEDs. In consequence, at the position at which light of one B-LED starts intersecting light of the adjacent B-LED, the difference between the intensity of light traveling straight and the intensity of light at the intersecting position becomes small, too, and the uniformity of light power can be improved. Furthermore, the degree of color non-uniformity becomes small when the color mixes with light of the R-LED and the G-LED.

A side-light type backlight, according to the present invention, comprises a light source including a plurality of LEDs, and a light guide plate, opposing end surfaces of the light guide plate being light incidence surfaces at which a plurality of R-LEDs, a plurality of G-LEDs and a plurality of B-LEDs are arranged, wherein a plurality of G-LEDs are arranged at one of the light incidence surfaces and the plurality of R-LEDs and the plurality of B-LEDs are arranged at the opposing light incidence surface.

According to this construction, a plurality of LEDs are allocated to the two opposing light incidence surfaces of the light guide plate and the heat generated by all the LEDs is divided into both sides of the light guide plate. Therefore, heat radiation to the surroundings of the LEDs is facilitated and the LEDs can be cooled efficiently, so that service life of the LEDs can be extended. Further, only the G-LEDs which generate heat most are arranged on one of the light incidence surfaces. Since only the G-LEDs having great heat generated are arranged on one of the light incidence surfaces, cooling can be conducted efficiently on both sides of the light guide plate.

A side light type backlight, according to the invention, comprises a light source including a plurality of LEDs, and a light guide plate, opposing end surfaces of the light guide plate being light incidence surfaces at which a plurality of R-LEDs, a plurality of G-LEDs and a plurality of B-LEDs are arranged, wherein the plurality of G-LEDs and the plurality of B-LEDs are arranged at one of the light incidence surfaces and the plurality of R-LEDs are arranged on the opposing light incidence surface.

According to this construction, the LEDs are allocated to the two light incidence surfaces of the light guide plate opposing each other and the heat generated by all the LEDs is divided into two sides of the light guide plate. Therefore, heat radiation to the surroundings of the LEDs becomes facilitated and the LEDs can be cooled efficiently, so that service life of the LEDs can be improved. Further, only the R-LEDs easily susceptible to the influences of the temperature are arranged on one of the light incidence surfaces. As only the R-LEDs are arranged on one of the light incidence surfaces, a cooling structure in which weight of cooling is considered more for the R-LED side becomes possible. In other words, the R-LEDs, the light emission characteristics of which are likely to fluctuate in accordance with the change of the temperature, are able to emit light more efficiently.

A side-light type backlight, according to the invention, comprises a light source including a plurality of LEDs, and a light guide plate, at least one of opposing end surfaces of the light guide plate being light incidence surface at which a plurality LEDs are arranged, wherein the plurality of LEDs include a plurality of white LEDs and a plurality of B-LEDs.

According to this construction, the white chromaticity can be shifted towards the blue side by using the white LEDs and the B-LEDs in combination, in the case where the white chromaticity deviates towards the yellow side when only the white LEDs are used. Therefore, when the white chromaticity deviates from the specification value due to product variance of the white LEDs, the white color can be adjusted to optimum white by adjusting the driving current of the B-LEDs.

A side-light type backlight, according to the present invention, comprises a light source including a plurality of LEDs, and a light guide plate, at least one of opposing end surfaces of the light guide plate being light incidence surface at which a plurality LEDs are arranged, wherein at least two rows of the plurality of LEDs are arranged in a direction of thickness of the light guide plate and the LEDs of each of the rows are arranged in a longitudinal direction of the light incidence surface of the light guide plate.

According to this construction, a large number of LEDs can be arranged even when only one light incidence surface of the light guide plate exists, and high brightness can be achieved.

A side-light type backlight, according to the present invention, comprises a light source including a plurality of LEDs, and a light guide plate, opposing end surfaces of the light guide plate being light incidence surfaces at which a plurality LEDs are arranged, wherein the LEDs at both ends are arranged in such a fashion that a light emission portion of each of the LEDs opposes an extreme end of the light incidence surface of the light guide plate in a longitudinal direction.

According to this construction, because light can be sufficiently irradiated onto edges of the light guide plate, the shadows of the edges of the light guide plate become small and cannot be easily recognized even when they enter the display area. Therefore, the display quality can be maintained.

A side-light type backlight, according to the present invention, comprises a light source including a plurality of LEDs, and a light guide plate, opposing end surfaces of the light guide plate being light incidence surfaces at which the plurality of LEDs are arranged wherein a frame is provided for accommodating the light source and the light guide plate, and a member having an elastic property or a spring property is arranged between the light source and the frame or between the light incidence surface of the light guide plate and the opposing end surface in such a fashion as to press the LEDs to the light guide plate.

According to this construction, the surfaces of the LEDs are brought into close contact with the light incidence surface of the light guide plate due to the urging operation of the member having the elastic property or the spring property. Therefore, light leaving the LEDs is efficiently made incident to the light guide plate and the utilization efficiency of light can be improved.

A side-light type backlight, according to the present invention, comprises a light source including a plurality of LEDs, and a light guide plate, opposing end surfaces of the light guide plate being light incidence surfaces at which the plurality of LEDs are arranged, wherein the plurality of LEDs are mounted to a circuit substrate, and a member having a higher heat conductivity than that of air is interposed between one of mounting surfaces and surfaces other than light outgoing surfaces of the LEDs and a surface of a housing of the light source or a surface of a frame constituting a backlight unit.

According to this construction, the LEDs and the housing are substantially maintained in close contact. Consequently, heat generated from the LEDs satisfactorily flows to the housing and heat radiation of the LEDs can be made efficiently. Therefore, the LEDs can keep a high light emission efficiency and a high brightness and the life can be improved.

A side-light type backlight, according to the present invention, comprises a light source including a plurality of LEDs, and a light guide plate, opposing end surfaces of the light guide plate being light incidence surfaces at which the plurality of LEDs are arranged, wherein the plurality of LEDs are mounted on a circuit substrate, and one of mounting surfaces and surfaces other than light outgoing surfaces of the LEDs keeps contact with a surface of a housing of the light source portion or a surface of a frame constituting a backlight unit.

According to this construction, the LEDs and the housing keep substantially the close contact state. Consequently, heat generated from the LEDs satisfactorily flows to the housing and heat radiation of the LEDs can be made efficiently. Therefore, the LED can keep a high light emission efficiency and high luminance and the life can be improved.

A side light type backlight, according to the present invention, comprises a light source including a plurality of LEDs, and a light guide plate, opposing end surfaces of the light guide plate being light incidence surfaces at which the plurality of LEDs are arranged, wherein the light guide plate has a taper shape at an end portion thereof on the side of the light incidence surface, and a jig for fixing the LEDs has a taper shape substantially coming into close contact with the taper shape of the light guide plate.

According to this construction, the light guide plate having the taper portion and the light source including the LEDs can be stably fixed to the jig. Further, a part of the light made incident to the light guide plate from the incidence surface of the light guide plate is reflected by the tapered portion of the light guide plate and travels in the light guide plate at an angle closer to the axis of the light guide plate. Therefore, the tapered portion of the light guide plate has the function of narrowing the diverging angle of incident light to the light guide plate. Therefore, the amount of light of outgoing light from the light guide plate can be increased.

A side-light type backlight, according to the present invention, comprises a light source including a plurality of LEDs, and a light guide plate, opposing end surfaces of the light guide plate being light incidence surfaces at which the plurality of LEDs are arranged, wherein the plurality of LEDs are arranged with intervals among them, and a member is interposed between the LED and the LED.

According to this construction, the LEDs can be fixed at predetermined positions, and the light emitting portions of the LEDs and the incidence surface of the light guide plate can be brought more reliably into mutual contact.

A side-light type backlight, according to the present invention, comprises a light source including a plurality of LEDs, and a light guide plate, opposing end surfaces of the light guide plate being light incidence surfaces at which the plurality of LEDs are arranged, wherein the LEDs are mounted to a circuit substrate, and light outgoing surfaces of the LEDs protrude outward from the circuit substrate.

According to this construction, the outgoing surfaces of the LEDs can more easily come into close contact with the incidence surface of the light guide plate, and light can be therefore introduced efficiently. Therefore, a brighter backlight can be accomplished.

A side-light type backlight, according to the present invention, comprises a light source including a plurality of LEDs, and a light guide plate, opposing end surfaces of the light guide plate being light incidence surfaces at which the plurality of LED are arranged, wherein M number of the LEDs are arranged in a longitudinal direction of the light incidence surface of the light guide plate and electrically connected such that there are a plurality of groups of LEDs with each group comprising N number of LEDs mutually adjacently arranged in series.

According to this construction, a driving voltage of the backlight containing a large umber of LEDs can be lowered.

A side-light type backlight, according to the present invention, comprises a light source including a plurality of LEDs, and a light guide plate, opposing end surfaces of the light guide plate being light incidence surfaces at which the plurality of LEDs are arranged, wherein M number of the LEDs are arranged in a longitudinal direction of the light incidence surface of the light guide plate such that every S number of LEDs from the end are electrically connected to each other (S: a positive integer).

According to this construction, even when a certain LED becomes defective (open state, for example), the LEDs with the interval of S remain ON. Therefore, though the amount of light of the backlight drops, non-uniformity the amount of light cannot be recognized easily.

A side-light type backlight, according to the present invention, comprises a light source including a plurality of LEDs, and a light guide plate, opposing end surfaces of the light guide plate being light incidence surfaces at which the plurality of LEDs are arranged, wherein a plurality of rows of the LEDs are arranged in a direction of thickness of the light guide plate, with each row of the LEDs arranged in a longitudinal direction of the light incidence surface of the light guide plate and is electrically connected to one another in series.

According to this construction, even when any one of the LEDs becomes defective, no influence is exerted on the LEDs of other stages. Therefore, non-uniformity of light power hardly occurs even though the light power of the backlight changes.

A side-light type backlight, according to the present invention, comprises a light source including a plurality of LEDs, and a light guide plate, opposing end surfaces of the light guide plate being light incidence surfaces at which the plurality of LEDs are arranged, wherein a plurality of rows of the LEDs are arranged in a direction of thickness of the light guide plate, with each row of the LEDs arranged in a longitudinal direction of the light incidence surface of the light guide plate, N number of the LEDs being electrically connected in series in which the LEDs adjacent to each other are arranged in different rows.

According to this construction, non-uniformity the amount of light of the backlight can hardly be recognized even when any one of the LEDs becomes defective. The LED driving voltage can be lowered and the power source can be made compact in size.

A liquid crystal display device according to the invention includes the backlight described above and a liquid crystal panel.

As explained above, the present invention can secure uniformity of the amount of light in the light guide plate and uniformity of chromaticity, can prevent the drop of light emission efficiency due to heat generated by the LEDs, can cope with variance of the LEDs, can secure reliability and can improve efficiency.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

The present invention will now be explained with reference to the preferred embodiments and by way of the drawings.

Figure 1:
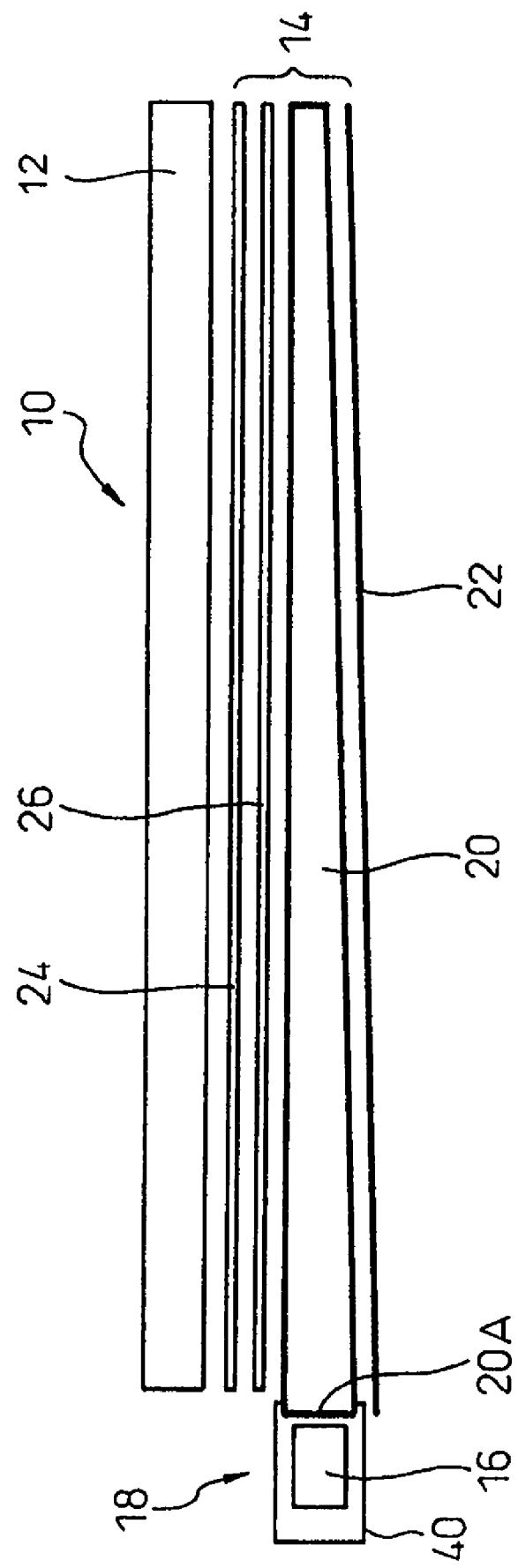
FIG. 1 is a view showing a liquid crystal display device.
Figure 2:
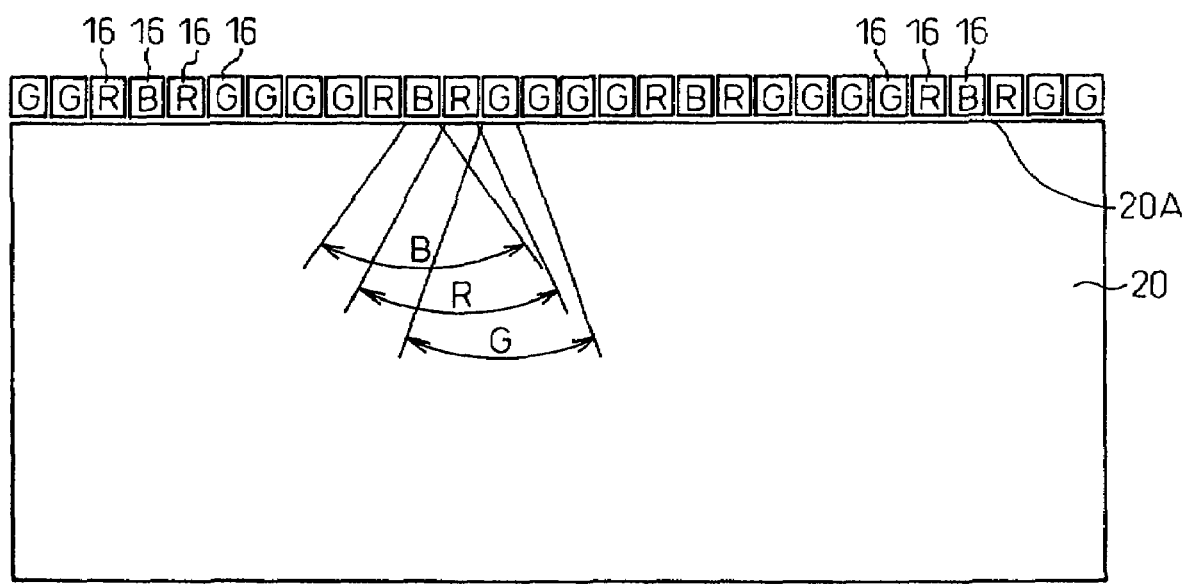
FIG. 2 is a view showing a backlight according to an embodiment of the present invention including a light source including a plurality of LEDs and a light guide plate.

FIG. 1 shows a liquid crystal display device according to an embodiment of the present invention. FIG. 2 shows a backlight including a light source including a plurality of LEDs, and a light guide plate, according to the embodiment of the present invention.

In FIG. 1, the liquid crystal display device 10 includes a liquid crystal panel 12 and a side light type backlight 14. The liquid crystal panel 12 includes a color filter and, whenever necessary, polarizers. The backlight 14 irradiates the liquid crystal panel 12 with white light.

The backlight 14 includes a light source 18 including a plurality of LEDs 16 and a light guide plate 20. The end surface 20A of the light guide plate 20 is a light incidence surface at which a plurality of LEDs 16 are arranged. The light guide plate 20 shown in FIG. 1 has a wedge shape that is tapered from the end surface 20A as the light incidence surface towards the opposite end surface. A reflection sheet 22 is arranged below the light guide plate 20 and optical sheets, such as a diffusion sheet 24 and a prism sheet 26, are arranged above the light guide plate 20.

Figure 5:
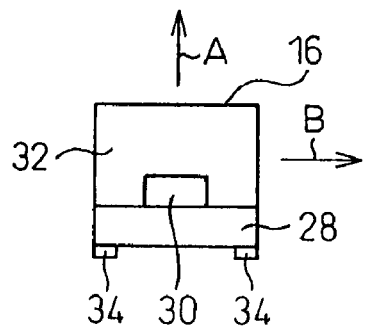
FIG. 5 is a schematic sectional view showing a typical example of the LED construction.

FIGS. 5 to 8 show a basic construction of the LED 16. FIG. 5 is a schematic sectional view showing a typical example of the construction of the LED 16. The LED 16 is fabricated by molding a semiconductor chip 30 mounted to a substrate 28 with a transparent resin 32. Electrodes 34 are provided in the substrate 28 and the LED 16 is connected to a power source through the electrodes 34. The LED 16 can emit light in a direction of an arrow A or an arrow B, for example. The size of the semiconductor chip 30 is from 0.3 to 1 mm square, for example, and the size of the LED 16 is from 0.5 to several mm square, for example.

Figure 6:
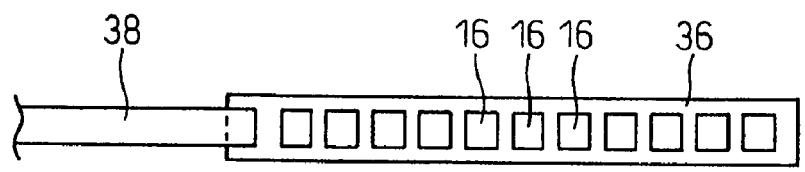
FIG. 6 is a plan view showing a circuit substrate having a plurality of LEDs mounted thereto and a flexible circuit substrate connected to the circuit substrate.

FIG. 6 is a plan view showing a circuit substrate 36 having a plurality of LEDs 16 mounted thereto and a flexible circuit substrate 38 connected to the circuit substrate 36. The circuit substrate 36 has a length necessary for mounting the plurality of LEDs 16 and the electrodes 34 of the LEDs 16 are connected to corresponding conductors of the circuit substrate 36. The flexible circuit substrate 38 is connected to the circuit substrate 36 at the end of the circuit substrate 36 and is further connected to a power source and a control device, not shown in the drawings. The circuit substrate 36 may be by itself a flexible circuit substrate.

Figure 7:
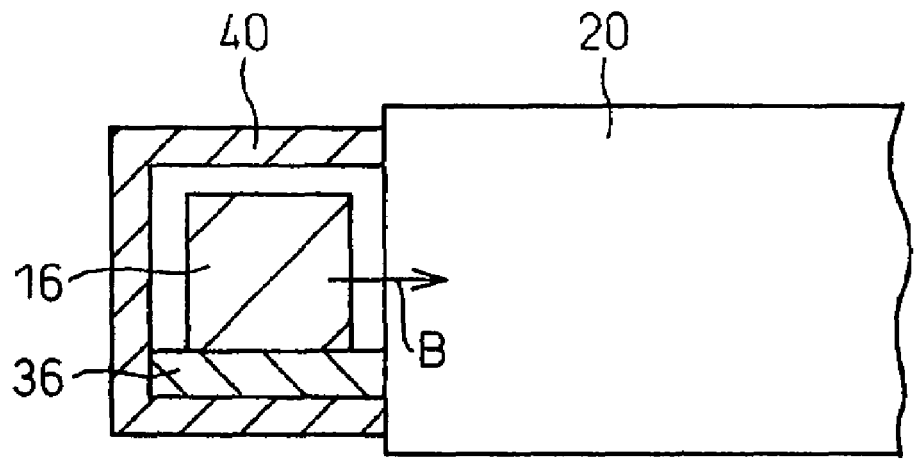
FIG. 7 is a sectional view showing an example of an LED housing for accommodating a plurality of LEDs and a circuit substrate, and a light guide plate.

FIG. 7 is a sectional view showing an example of an LED housing 40 for accommodating a plurality of LED 16 and the circuit substrate 36, and the light guide plate 20. The LED housing 40 is an elongated member having a sectional shape of a horizontally inverted U. The length of the LED housing 40 corresponds to the length of the circuit substrate 36 in FIG. 6, for example. An opening on one of the sides of the LED housing 40 faces the light guide plate 20. The circuit substrate 36 to which a plurality of LED 16 is mounted under the state shown in FIG. 6 is accommodated in the LED housing 40. In FIG. 7, the circuit substrate 36 is fixed to the bottom wall of the LED housing 40 through an adhesive, for example. The LED 16 emits light towards the light guide plate 20 as indicated by the arrow B, for example.

Figure 8:
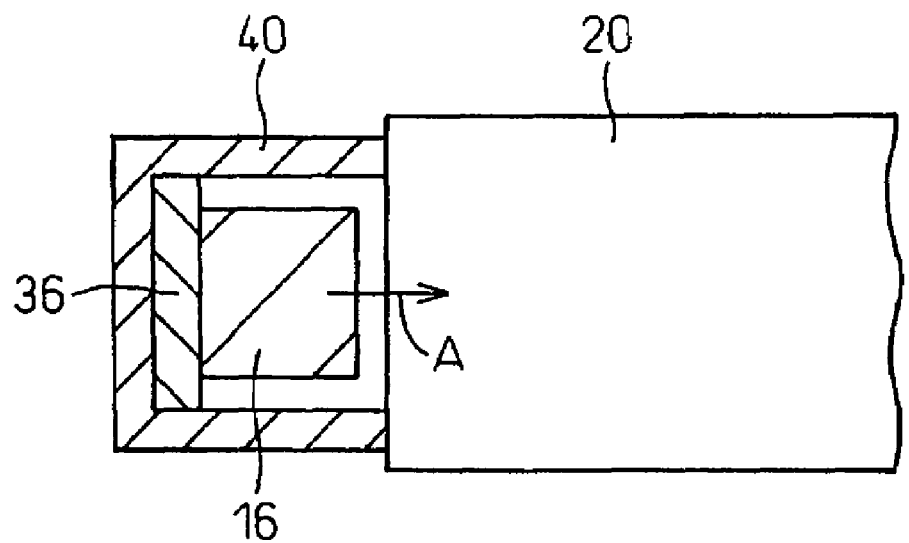
FIG. 8 is a sectional view showing another example of an LED housing for accommodating a plurality of LEDs and a circuit substrate, and a light guide plate.

FIG. 8 is a sectional view showing an example of the LED housing 40 accommodating a plurality of LEDs 16 and the circuit substrate 36, and the light guide plate 20. In this case, the circuit substrate 36 is fixed to a vertical wall of the LED housing 40. The LED 16 emits light towards the light guide plate 20 as indicated by the arrow A, for example.

FIG. 1 shows only the LED 16 and the LED housing 40 as the light source 18.

In FIG. 2, a plurality of LEDs 16 include a plurality of R-LEDs (red LEDs), a plurality of G-LEDs (green LEDs) and a plurality of B-LEDs (blue LEDs). Marks R, G and B are allocated to the LEDs 16, respectively. The number of R-LEDs 16, the number of G-LEDs 16 and the number of B-LEDs 16 are different from one another. This embodiment is directed to appropriately constitute a white light source by all the LEDs 16. In this case, the amount of light of G-LEDs 16 is preferably greatest while the amount of light of B-LEDs 16 is preferably smallest. Therefore, if the amounts of light of all the LEDs 16 are the same, the number of G-LEDs 16 is the greatest and the number of B-LEDs 16 is the smallest. However, the number of the LEDs 16 of respective colors is not limited to the proportion shown in the drawing.

Figure 3A:
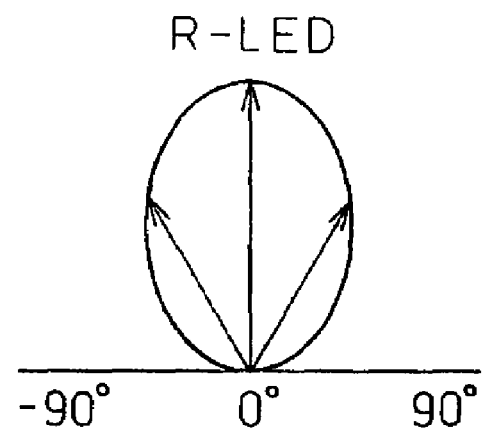
FIGS. 3A to 3C are views showing light distribution characteristics of light emitted from LEDs of respective colors.
Figure 3B:
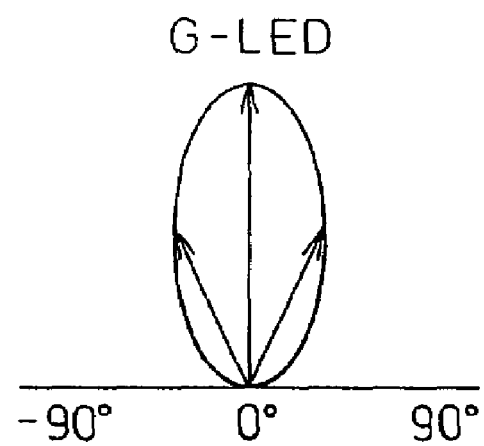
Figure 3C:
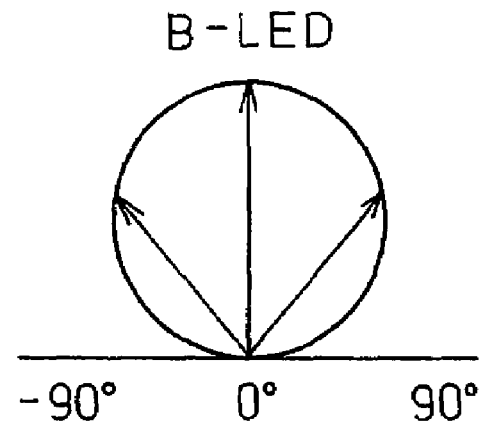

FIGS. 3A to 3C show light distribution characteristics emitted from the LEDs 16 of respective colors. FIG. 3A shows the light distribution characteristics of the R-LEDs 16. FIG. 3B shows the light distribution characteristics of the G-LEDs 16. FIG. 3C shows the light distribution characteristics of the B-LEDs 16. The light distribution range (the angular range in which light diverges) is smallest in the light distribution characteristics of the G-LEDs 16 and is greatest in the light distribution characteristics of the B-LEDs 16. In other words, the relationship of: the light distribution range of G-LEDs 16<the light distribution range of R-LEDs 16<the light distribution range of B-LEDs 16 is satisfied.

Figure 4:
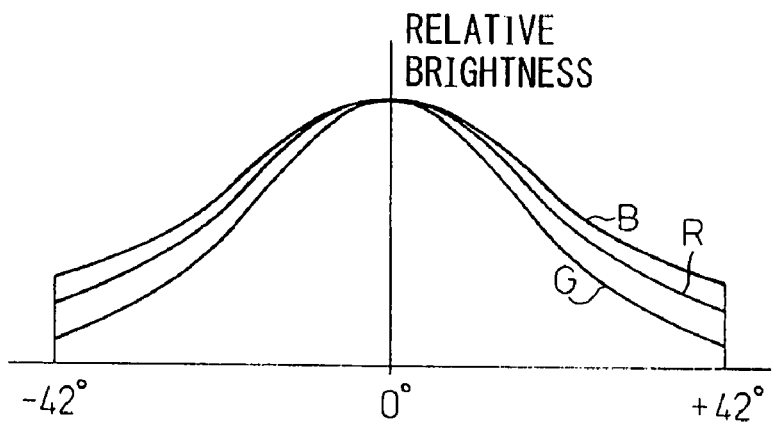
FIG. 4 is a view showing light distribution characteristics of light outgoing from the LEDs of respective colors in the light guide plate.

FIG. 4 shows distribution characteristics of light leaving the LEDs of respective colors in the light guide plate. In the light guide plate 20, light leaving the B-LEDs 16 and traveling at a relatively large angle in the light guide plate 20 has a relatively high brightness and light leaving the G-LEDs 16 and traveling at a relatively small angle has relatively low brightness.

In this embodiment, the light guide plate 20 is made of an acrylic resin. Light incident, from each LED 1, onto the light guide plate 20 travels with a divergent range of about ±42°. As to the distribution characteristics of each color, the light distribution characteristics of the B-LEDs 16 has the highest uniformity and the light distribution characteristics of the G-LEDs 16 has peak distribution characteristics as shown in FIG. 3. Therefore, in the distribution characteristics of light made incident into the light guide plate 20, light exists within the range of ±42° as shown in FIG. 4, and B (blue) light has higher intensity at 42° than R (red) and G (green) light at ±42°. As a result, although the interval between the B-LEDs 16 is greater than the interval between the LEDs 16 of the other color, the light mixed in the light guide plate 20 is apt to become uniform. As to the R-LEDs 16 and the G-LEDs 16, on the other hand, even when light of R (red) or light of G (green) starts to mix, non-uniformity of the amount of light occurs at a position in the proximity of the end surface 20A at which the color mixture starts occurring because the difference of the light intensity is small between the 0° direction and the 42° direction. As a result, even in the construction in which the number of the B-LEDs 16 is small and the LEDs are arranged at greater intervals, the light intensity can be made uniform at a position near the light incidence surface 20A of the light guide plate 20. Also, a color non-uniformity resulting from color mixing can be reduced.

The number of the LEDs 16 and the arrangement positions are not limited to those shown in the drawings and they are the parameters that are designed in accordance with the characteristics of the LEDs 16 to be used and the specification of chromaticity.

Figure 9:
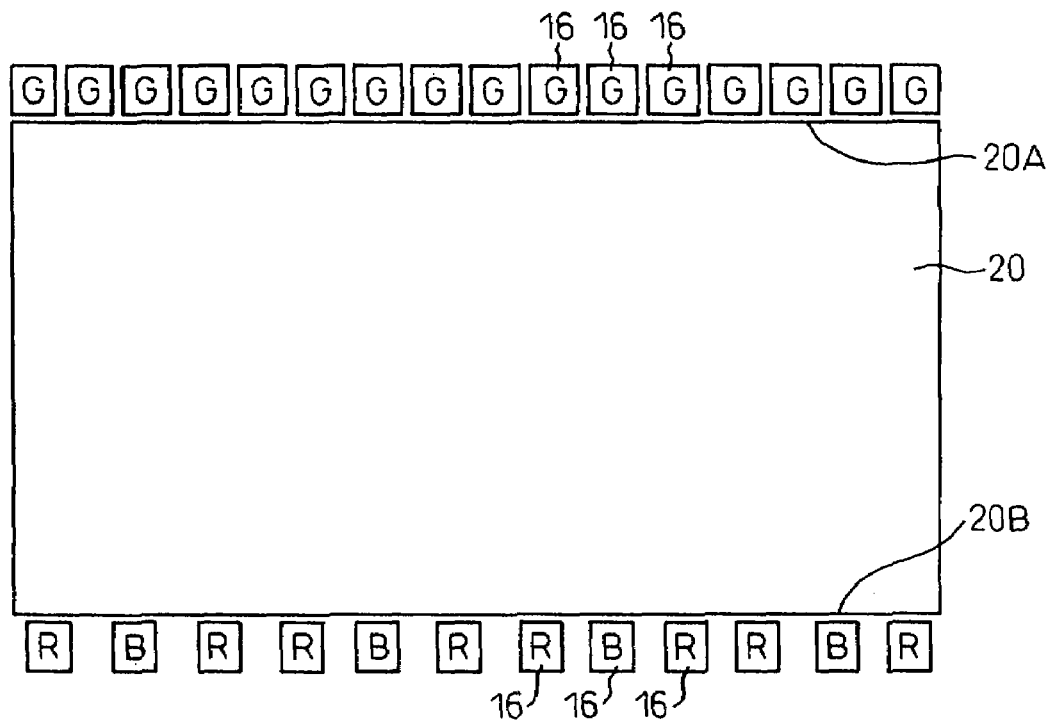
FIG. 9 is a view showing a backlight according to still another embodiment of the present invention.

FIG. 9 shows a backlight according to another embodiment of the present invention. This embodiment has substantially the same basic construction as that of the foregoing embodiment. The backlight 14 has a light source 18 including a plurality of LEDs 16, and a light guide plate 20. In the embodiments explained below, too, the backlight includes the light source including a plurality of LEDs 16, and the light guide plate 20, as described above. Therefore, a repeated explanation of the basic construction of the following embodiments will be omitted.

In this embodiment, opposing end surfaces 20A and 20B of the light guide plate 20 are light incidence surfaces and the LEDs 16 of R, G and B are assigned to the light incidence surfaces 20A and 20B. A plurality of G-LEDs 16 are arranged at one of the light incidence surfaces 20A and a plurality of R-LEDs 16 and a plurality of B-LEDs 16 are arranged at the opposing light incidence surface 20B.

When the white balance is secured, the number of G-LEDs 16 becomes the greatest as described above, and therefore, only the G-LEDs 16 are arranged at one of the light incidence surfaces 20A. In consequence, the amount of heat generated by all the LEDs 16 is divided substantially uniformly between the light incidence surface 20A and the light incidence surface 20B. Therefore, a large number of LEDs 16 can be cooled efficiently, the light emission efficiency is not reduced and the service life can be prolonged. In this case, the LEDs 16 may have the light distribution characteristics shown in FIGS. 3 and 4.

Figure 10:
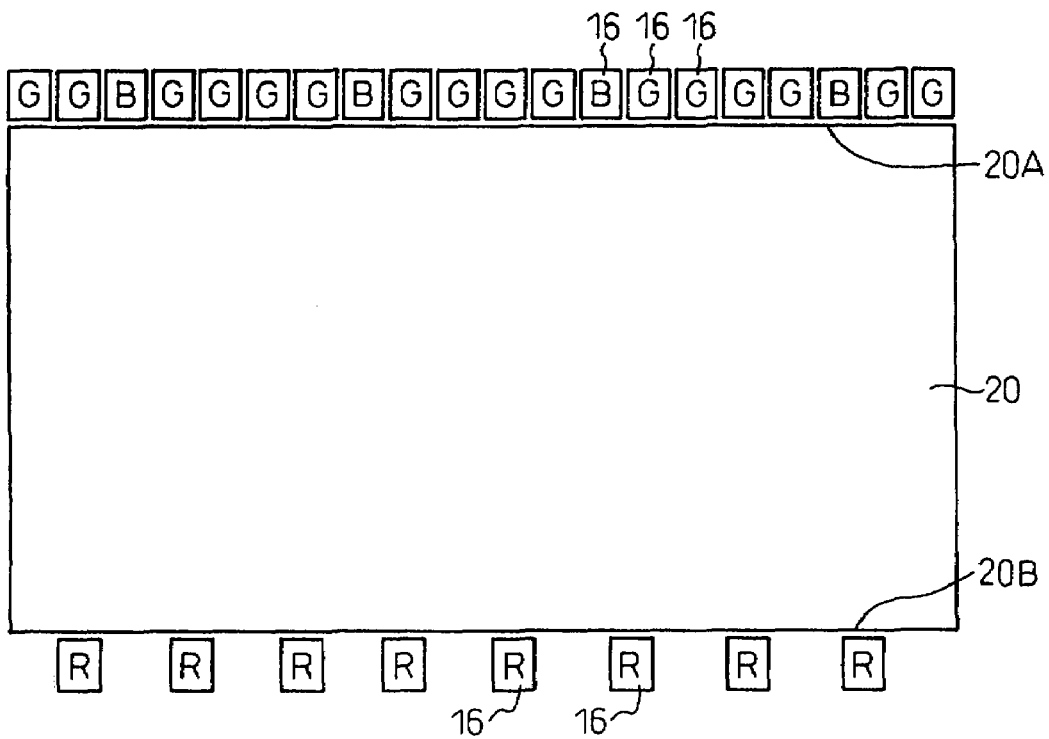
FIG. 10 is a view showing a backlight according to a further embodiment of the invention.

FIG. 10 shows a backlight according to a further embodiment of the present invention. In this embodiment, the opposing end surfaces 20A and 20B of the light guide plate 20 are the light incidence surfaces and the R, G and B-LEDs 16 are assigned to the light incidence surfaces 20A and 20B.

A plurality of G-LEDs 16 and a plurality of B-LEDs 16 are arranged on the side of one of the light incidence surfaces 20A, and a plurality of R-LEDs 16 are arranged on the side of the opposing light incidence surface 20B. Because the R-LEDs 16 are most susceptible to the temperature, only the R-LEDs 16 are arranged on the side of one of the light incidence surfaces 20B. In consequence, the R-LEDs 16 can be efficiently cooled, light emission efficiency of the R-LEDs 16, which are most susceptible to the temperature, can be improved and the service life can be prolonged.

Figure 11:
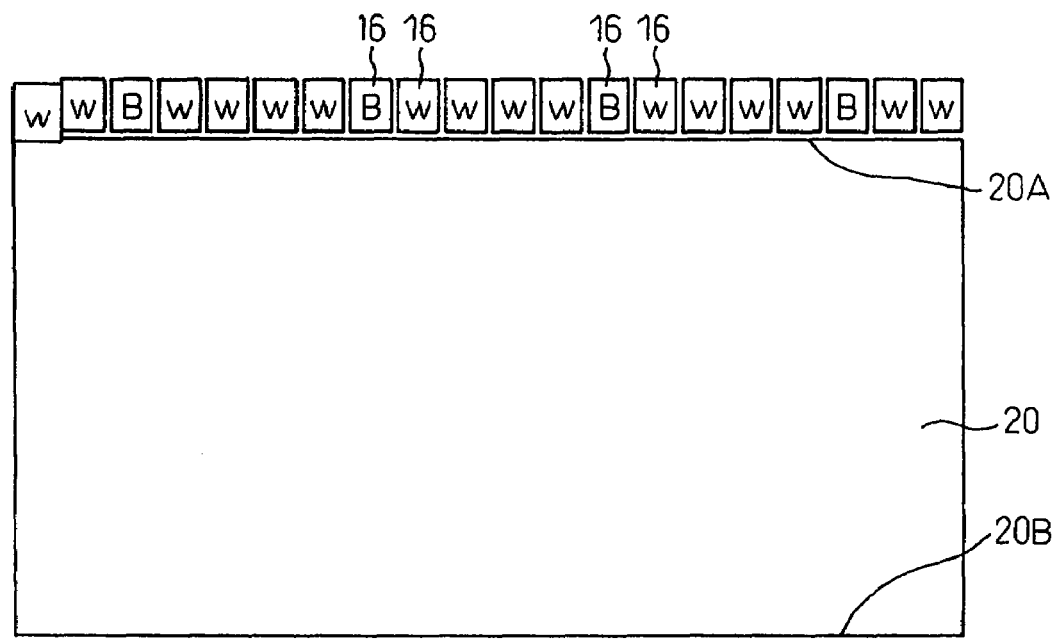
FIG. 11 is a view showing a backlight according to a further embodiment of the invention.

FIG. 11 shows a backlight according to a further embodiment of the present invention. In this embodiment, one of the end surfaces 20A of the light guide plate 20 is the light incidence surface. A plurality of white LEDs 16 and a plurality of B-LEDs 16 are arranged at the light incidence surface 20A. The white LEDs 16 are represented by symbol W.

In the construction in which the white LEDs 16 and B-LEDs 16 are used in combination, the B-LEDs 16 can shift the white chromaticity towards the blue side to accomplish a desired white chromaticity because, when only the white LEDs 16 are used, the white chromaticity is closer to the yellow side. Therefore, when white chromaticity deviates from the specification value due to variance of the products of the white LEDs 16, the white color can be adjusted to the optimum white color by adjusting a driving current of the B-LEDs 16. Though this embodiment uses the B-LEDs 16, the G-LEDs or the R-LEDs may well be used, as well.

One of the end surfaces 20A of the light guide plate 20 is the light incidence surface in the illustrated embodiment, but both end surfaces 20A and 20B of the light guide plate 20 may be used as the light incidence surfaces. In this case, a plurality of white LEDs 16 and a plurality of B-LEDs 16 are arranged on each of the light incidence surfaces 20A and 20B. It is also possible to arrange the white LEDs 16 on one of the light incidence surfaces and the B-LEDs 16 on the opposing light incidence surface.

Figure 12:
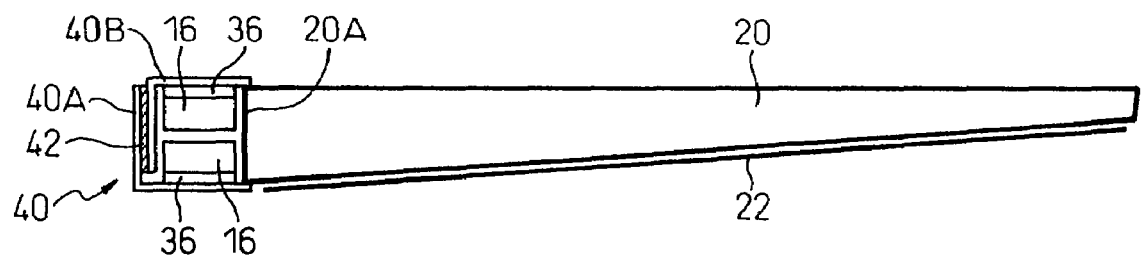
FIG. 12 is a view showing a backlight according to a further embodiment of the invention.
Figure 13:
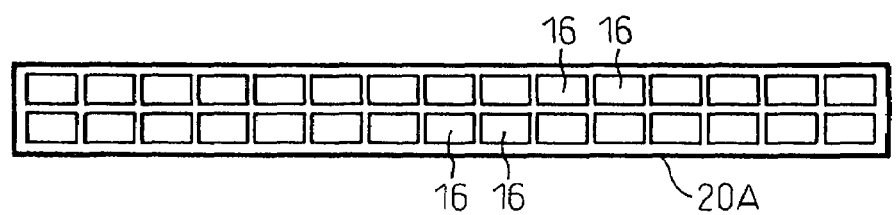
FIG. 13 is a view showing the arrangement of the LEDs shown in FIG. 12.

FIG. 12 shows a backlight according to a still further embodiment of the present invention. FIG. 13 shows the arrangement of the LEDs shown in FIG. 12. In this embodiment, the LEDs 16 are arranged in upper and lower rows at the light incidence surface 20A of the light guide plate 20. As shown in FIG. 13, the LEDs 16 of the upper and lower rows are arranged in such a fashion as to fully cover the light incidence surface 20A of the light guide plate 20.

In this case, the LED housing 40 is formed by two L-shaped metal plates 40A and 40B bonded together by an adhesive sheet 42. The LEDs 16 of the lower row are fixed to the bottom wall of the L-shaped metal plate 40A through the circuit substrate 36 and the LEDs 16 of the upper row are fixed to the upper wall of the L-shaped metal plate 40B through the circuit substrate 36. The LEDs 16 are of the side view type that emits light in the direction of the arrow B in FIG. 5. The circuit substrate 36 may be a flexible circuit substrate. The thickness of the light guide plate 20 on the side of the light incidence surface is 2 mm and the thickness of the LEDs 16 is 0.8 mm, by way of example. Therefore, the LEDs 16 can be arranged in the upper and lower rows. Because a large number of LEDs 16 can be arranged even in the case of the wedge-shaped light guide plate 20 having only one light incidence surface, high brightness can be accomplished.

Figure 14:
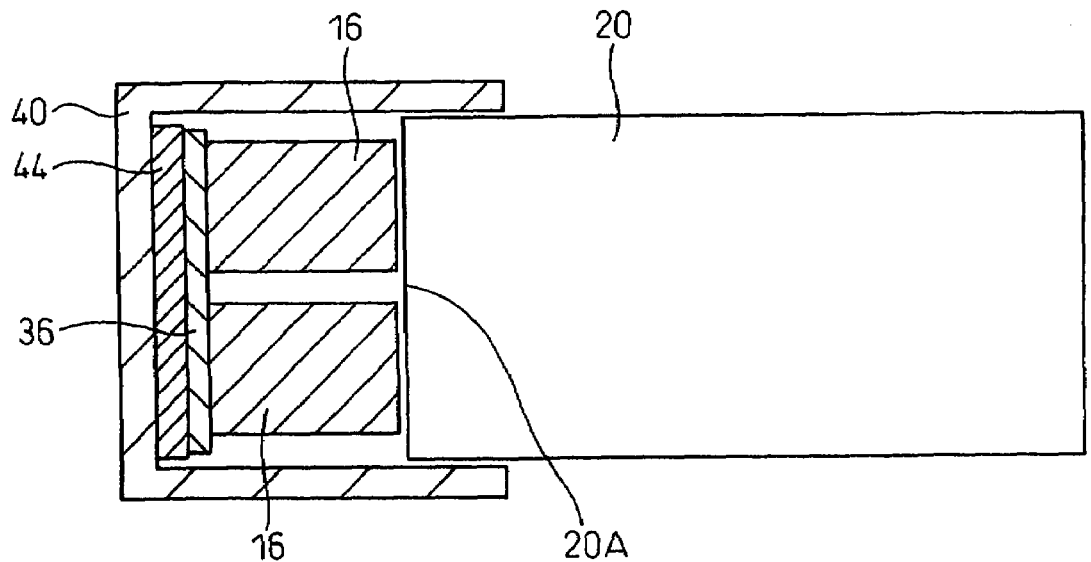
FIG. 14 is a view showing a backlight according to a still further embodiment of the invention.

FIG. 14 shows a backlight according to a still further embodiment of the present invention. In the embodiment shown in FIG. 14, the LEDs 16 are arranged at the light incidence surface 20A of the light guide plate 20 in two, upper and lower, rows, in the same way as in the embodiments shown in FIGS. 12 and 13. The LEDs 16 of the upper and lower rows are arranged in two rows on a single circuit substrate (or a flexible circuit substrate) 36. The circuit substrate 36 is fixed to the vertical wall of the LED housing 40 through a metal plate 44 of aluminum, or the like. The metal plate 44 assists heat radiation of the LEDs 16. The LEDs 16 shown in FIG. 14 are of a top view type that emits light in the direction indicated by the arrow A in FIG. 5. FIGS. 12 to 14 show the LEDs 16 having the two-row construction but the LEDs 16 may be constituted into three or more rows.

Figure 15:
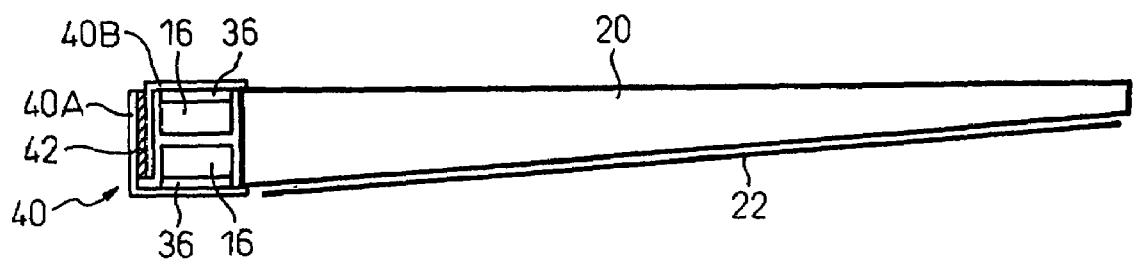
FIG. 15 is a view showing a backlight according to a still further embodiment of the invention.
Figure 16:
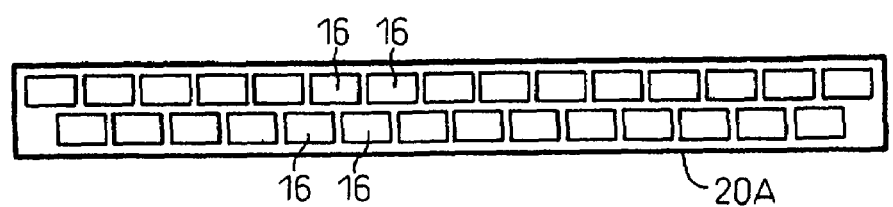
FIG. 16 is a view showing the arrangement of the LEDs shown in FIG. 15.

FIG. 15 shows a backlight according to a still further embodiment of the present invention. FIG. 16 shows the arrangement of the LEDs shown in FIG. 15. The LEDs 16 are arranged at the light incidence surface 20A of the light guide plate 20 in the upper and lower rows in the same way as in the embodiments shown in FIGS. 12 to 14. In FIG. 15, the LEDs 16 of the lower row are arranged between two adjacent LEDs 16 of the upper row. In other words, the LEDs 16 in the two rows are arranged in a staggered arrangement.

Figure 17:
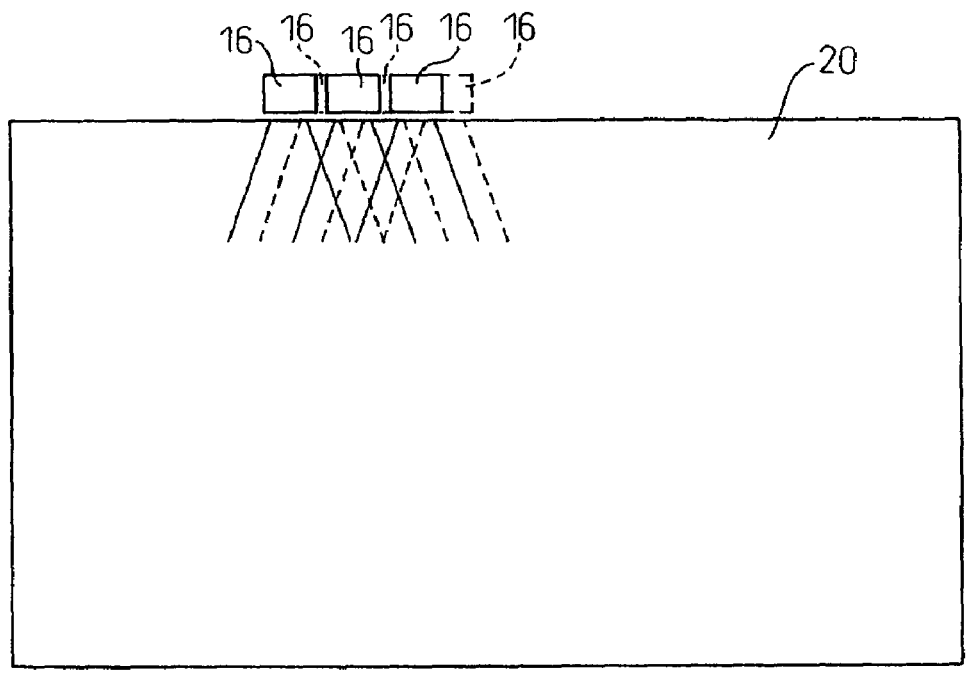
FIG. 17 is a view showing a travel of light in the light guide plate shown in FIGS. 15 and 16.

FIG. 17 shows the path of light in the light guide plate shown in FIGS. 15 and 16. The rays of light entering the light guide plate 20 from the LEDs 16 of the upper row are indicated by solid lines. The rays of light entering the light guide plate 20 from the LEDs 16 of the lower row are indicated by broken lines. When the LEDs 16 are viewed from above the light guide plate 16, the gap between the LED 16 and another LED 16 is ½, compared with that in one row, and accordingly, light mixes well at a position close to the light incidence surface 20A of the light guide plate 20 and non-uniformity of the amount of light becomes small. Consequently, a region in which the rays of light coming from the LEDs 16 of the lower row exist is positioned at a region in which the rays of light of the LEDs 16 of the upper row incident to the light guide plate 20 do not exist, and non-uniformity of the amount of light in the proximity of the light incidence surface of the light guide plate 20 can be improved.

Figure 18:
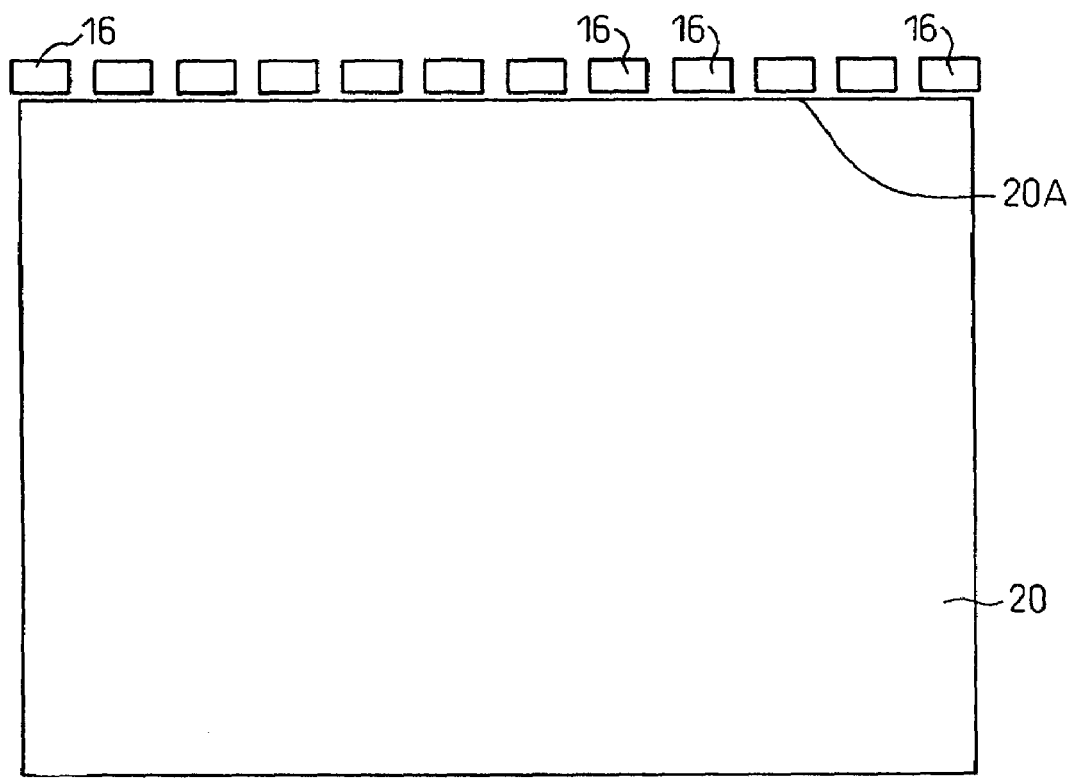
FIG. 18 is a view showing a backlight according to a still further embodiment of the invention.
Figure 19:
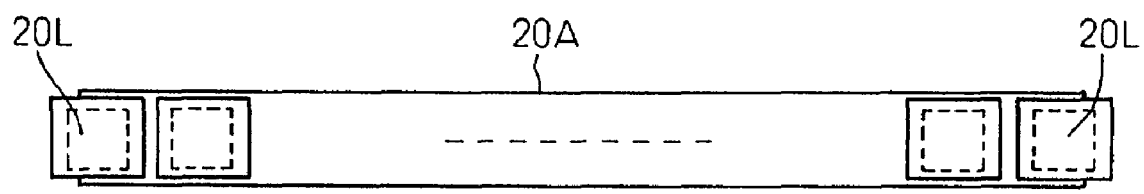
FIG. 19 is a view showing the arrangement of the LED shown in FIG. 18.

FIG. 18 shows a backlight according to a still further embodiment of the present invention. FIG. 19 shows the arrangement of the LEDs shown in FIG. 18. The LEDs 16 at both ends are arranged in such a fashion that the light emission portion 20L of the LED 19 opposes the extreme ends (both edges) of the light incidence surface 20A of the light guide plate 20. In the prior art devices, because light from the light source does not exist at the edges of the light guide plate or the amount of light is lower than that at other portions, the edges of the light guide plate have a shadow and the display quality drops. According to the construction of this embodiment, however, light having sufficient light intensity is irradiated to the edges of the light guide plate, the shadow at the edges of the light guide plate becomes small and the shadow of the edges cannot be recognized easily even when it enters the display area. In consequence, display quality can be maintained.

Figure 20:
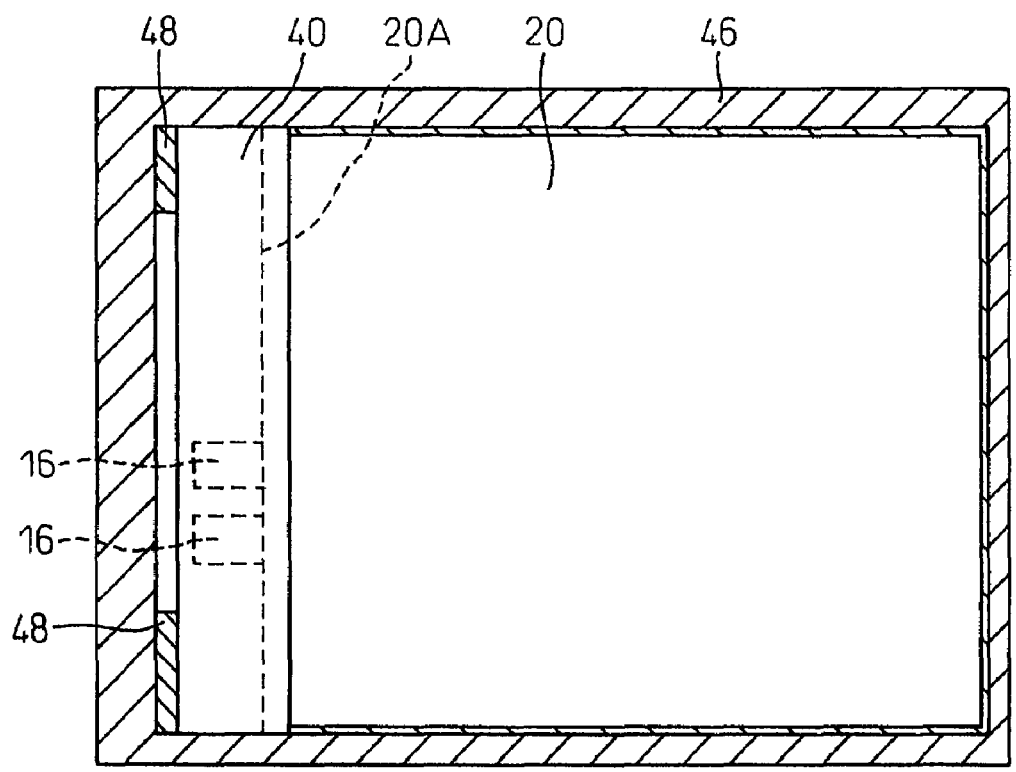
FIG. 20 is a view showing a backlight according to a further embodiment of the invention.
Figure 21:
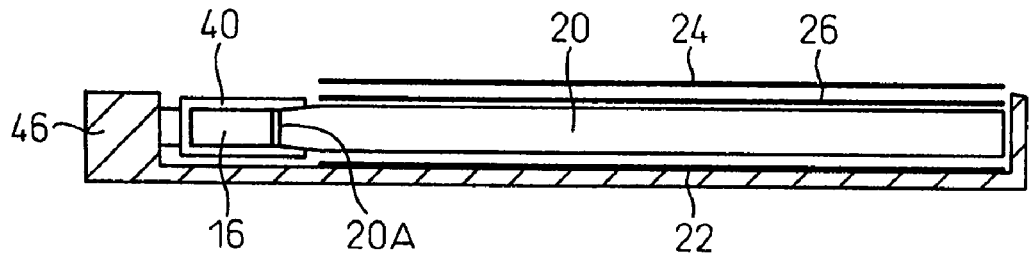
FIG. 21 is a sectional view of the backlight shown in FIG. 20.

FIG. 20 shows a backlight according to a still further embodiment of the present invention. FIG. 21 is a sectional view of the backlight shown in FIG. 20. A plurality of LEDs 16 are mounted in a row on the circuit substrate 36 (not shown in FIGS. 20 and 21) and arranged in the LED housing 40. The backlight comprising the light source including the LEDs 16 and the light guide plate is accommodated in a plastic frame 46. A metal frame can be also used in place of the plastic frame 46.

The edge portion of the light guide plate 20 having the light incidence surface 20A is inserted and fitted in the opening of the LED housing 40 so that the surfaces of the LEDs 16 are brought into close contact with the light incidence surface 20A of the light guide plate 20. In addition, a buffer material (such as a rubber plate or a gel-like plate) 48 is inserted between the inner surface of the plastic frame 46 and the outer surface of the LED housing 40. The buffer material 48 presses the LED housing 40 towards the light guide plate 20 with a certain spring force. As a result, the surfaces of the LEDs 16 inside the LED housing 40 and the incidence surface 20A of the light guide plate 20 are maintained in close contact. Therefore, light outgoing from the LEDs 16 efficiently enters the light guide plate 20 and utilization efficiency of light can be improved. Even when the light guide plate 20 undergoes expansion and contraction due to the change in the environment, the buffer material 48 correspondingly functions to keep contact between the LEDs 16 in the LED housing 40 and the light guide plate 20 without hindering expansion and contraction of the light guide plate 20.

Also, the opposing end surfaces of the light guide plate 20 are pressed to the inner surfaces of the plastic frame 46. When the plastic frame 46 is formed of a white color material having low light absorption, light leaking from the opposing end surfaces of the light guide plate 20 is reflected by the inner surfaces of the plastic frame 46, returns again into the light guide plate 20 and is utilized again. Otherwise, a similar effect can be obtained by inserting a reflecting sheet between the opposing end surfaces of the light guide plate 20 and the inner surfaces of the plastic frame 46.

Figure 22:
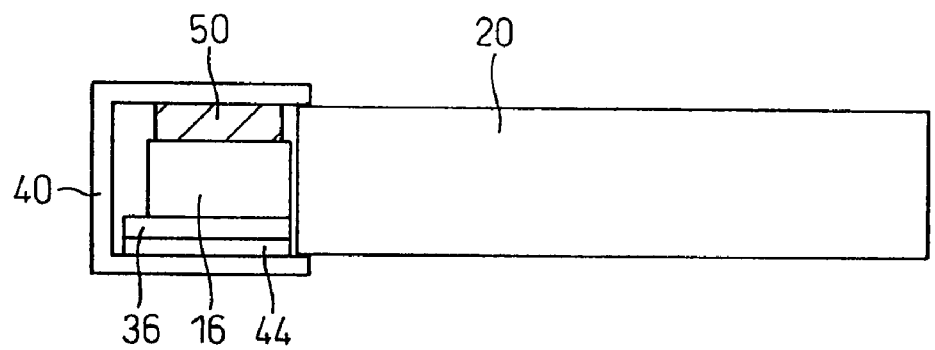
FIG. 22 shows a backlight according to a further embodiment of the invention.
Figure 23:
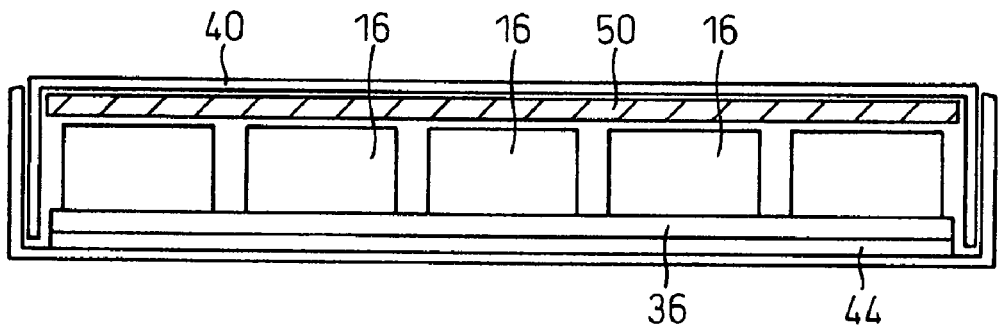
FIG. 23 is a sectional view through the LED housing shown in FIG. 22.

FIG. 22 shows a backlight according to a still further embodiment of the present invention. FIG. 23 is a sectional view through the LED housing shown in FIG. 20. A plurality of LEDs 16 are arranged in a row in the LED housing 40 through the circuit substrate 36. The circuit substrate 36 is fixed to the bottom wall of the LED housing 40. A soft sheet-like member 50 having a high heat conductivity is inserted between the upper wall of the LED housing 40 and the LEDs 16 so that the LEDs 16 and the upper wall of the LED housing 40 are in substantially close contact through the sheet-like member 50. Consequently, the heat generated by the LEDs 16 can flow to the upper and lower surfaces and the heat of the LEDs 16 can be efficiently dissipated. In consequence, light emission efficiency of the LEDs 16 can be maintained and high brightness and long service life can be provided. Even when the soft sheet-like member 50 having a high heat conductivity described above is not used, the heat radiation effect can be acquired when a member having high heat radiation property (resin type sheet, resin type adhesive sheet, etc) is used.

In the embodiment described above, it is also possible to use a housing construction in which a gap between the upper surfaces of the LEDs 16 opposite to the mounting surfaces of the LEDs 16 and the inner surface of the LED housing 40 is eliminated and the inner surface of the LED housing 40 keeps close contact with the LEDs 16. In the backlight according to the prior art, an air layer having a certain thickness exists at this portion and heat radiation performance is low. When this air layer is eliminated, the heat of the LEDs 16 can be quickly transferred to the LED housing 40 and is radiated outside from the LED housing 40.

Figure 24:
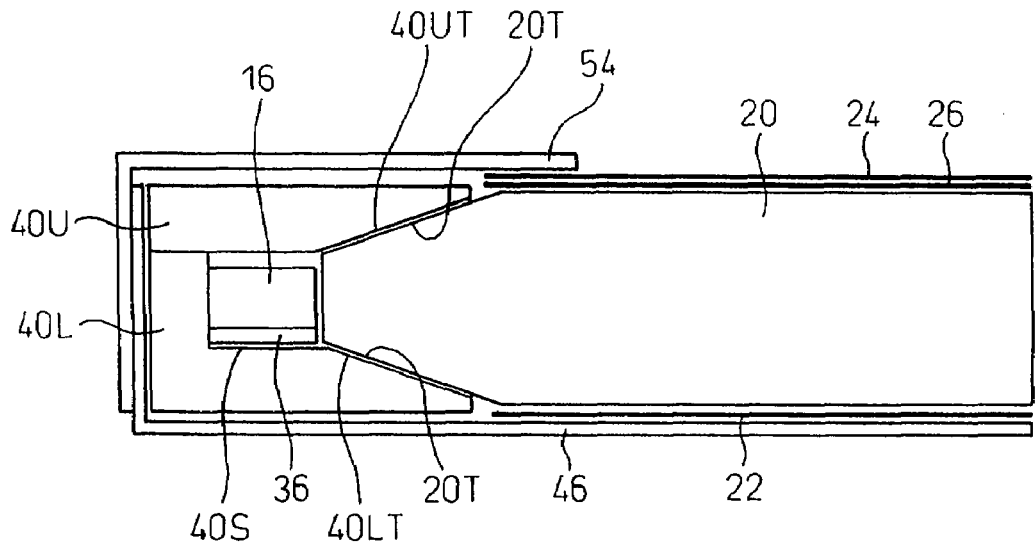
FIG. 24 is a view showing a backlight according to a further embodiment of the invention.

FIG. 24 shows a backlight according to a still further embodiment of the present invention. The plastic frame (or metal frame) 46 is further accommodated in a bezel 54. The end portion of the light guide plate 20 on the side of the light incidence surface is a tapered portion 20T with the taper provided in the direction of thickness. The LEDs 16 keep close contact with a narrow end surface (light incidence surface) at the distal end of the tapered portion 20T. The LED housing 40, as a jig for fixing the LEDs, includes an upper support frame 40U and a lower support frame 40L. The upper and lower support frames 40U and 40L have tapered portions 40UT and 40LT corresponding to the taper of the light guide plate 20. The lower support frame 40L has a seat portion 40S continuing the tapered portion 40LT for supporting the LEDs 16 fitted to the circuit substrate 36.

The upper support frame 40U and the lower support frame 40L are formed of a white color material free from light absorption or their surfaces are made of a member having a high reflection factor. Therefore, light leaking out from the surface other than the light incidence surface of the light guide plate 20 is again returned into the light guide plate 20 and light utilization ratio can be therefore improved.

In this construction, the tapered portion 20T of the light guide plate 20 is brought into close contact with the tapered portions 40UT and 40LT of the upper and lower support frames 40U and 40L and are fixed in such a condition that the light emission surfaces of the LEDs 16 abut against the light incidence surface of the light guide plate 20 without being deviated. According to this construction, the light source including the light guide plate 20 having the tapered portion 20T, and the LEDs 16, can be stably fixed to the LED housing 40. Because the light guide plate 20 has the tapered portion 20T, a part of light made incident from the incidence surface of the light guide plate 20 into the light guide plate 20 is reflected by the tapered portion 20T of the light guide plate 20 and travels in the light guide plate 20 at an angle approaching the axis of the light guide plate 20. Therefore, the tapered portion 20T has a function of reducing the expansion angle of incident angle of the light guide plate 20 and the amount of light of outgoing light from the light guide plate 20 can be improved.

Figure 25:
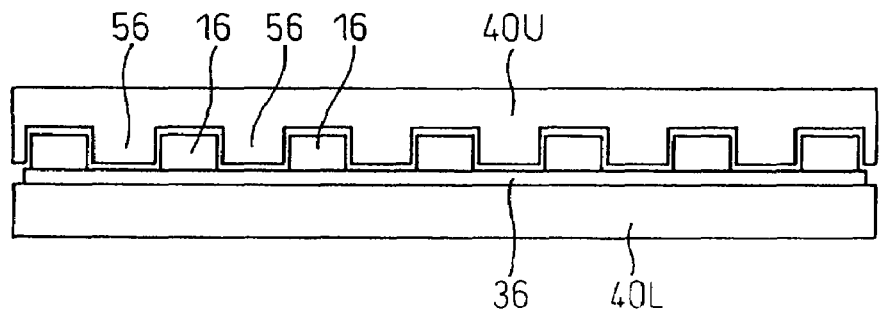
FIG. 25 is a view showing a backlight according to a further embodiment of the invention.
Figure 26:
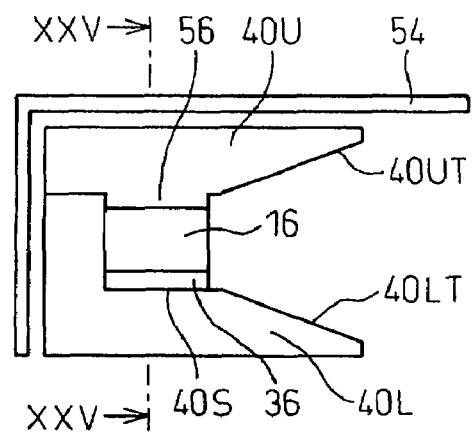
FIG. 26 is a sectional view through the LED housing shown in FIG. 25.

FIG. 25 shows a backlight according to a still further embodiment of the present invention and is a sectional view taken along a line XXV-XXV of FIG. 26. The light guide plate 20 is omitted from FIG. 26. In this embodiment, the light guide plate 20 has the tapered portion 20T, the upper and lower support frames 40U and 40L of the LED housing 40 have the tapered portions 40UT and 40LT, and the lower support frame 40L has the seat portion 40D, in the same way as in the embodiment shown in FIGS. 23 and 24. The upper and lower support frames 40U and 40L are formed of a white color material free from light absorption or the taper surface is a reflection surface.

A plurality of LEDs 16 are spaced apart from each other, and a member 56 having a reflection function is interposed between the LEDs 16. In this embodiment, the upper support frame 40U is shaped into a shape having projections and recesses, and the LEDs 16 are arranged in the recesses, while the projections forming the member 56 having the reflection function. In this case, the upper support frame 40U and the lower support frame 40L are formed of a white color material free from light absorption, or their surfaces are members having a high reflection factor. Therefore, this embodiment has an effect similar to the function and effect of the embodiment shown in FIGS. 23 and 24 and the LEDs 16 are fixed at the predetermined position, so that the light emission portions of the LEDs 16 and the incidence surface of the light guide plate 20 can be brought more reliably into contact with each other. Therefore, a greater amount of light enters the light guide plate 20 from the LEDs 16. However, this embodiment can be applied also to the light guide plate not having the taper shape so long as a plurality of LEDs 16 are arranged with the gap and the member 56 is interposed between the LED 16 and the LED 16.

Figure 27:
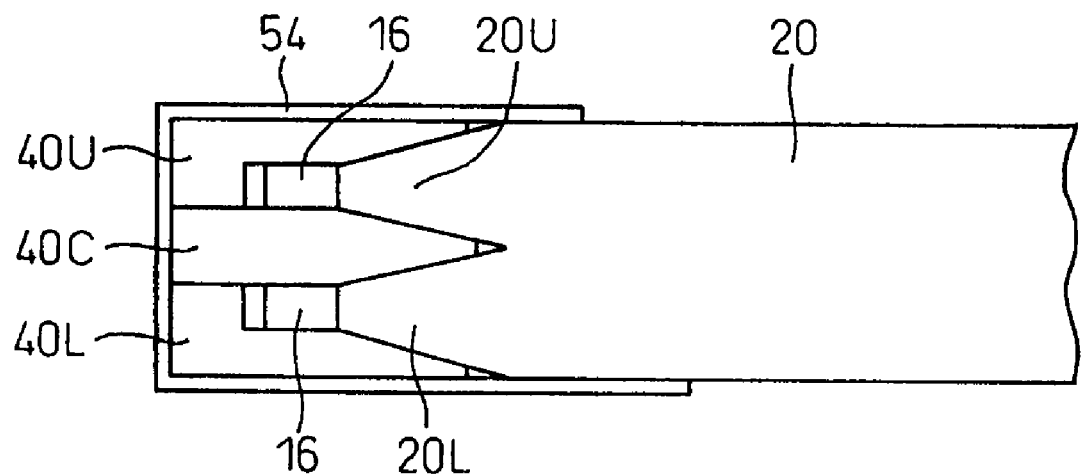
FIG. 27 is a view showing a backlight according to a further embodiment of the invention.

FIG. 27 shows a backlight according to a still further embodiment of the present invention. This embodiment is constituted in a way similar to the embodiment shown in FIGS. 23 and 24 except that it is so constituted as to match the LEDs 16 arranged in two rows. The light guide plate 20 in this embodiment has a portion 20L coming into contact with the LEDs 16 of the lower row and a portion 20U coming into contact with the LEDs 16 of the upper row. Further, the LED housing 40 includes the upper support frame 40U, the lower support frame 40L and an intermediate support frame 40C. Each part of the light guide plate 20 and the LED housing 40 includes a tapered portion similar to the tapered portion respectively shown in FIGS. 23 and 24. The intermediate support frame 40C is inserted between the upper support frame 40U and the lower support frame 40L and between the portions 20L and 20U of the light guide plate 20.

Therefore, the embodiment shown in FIG. 27 provides the function and effect similar to those of the embodiments shown in FIGS. 23 to 26.

Figure 28:
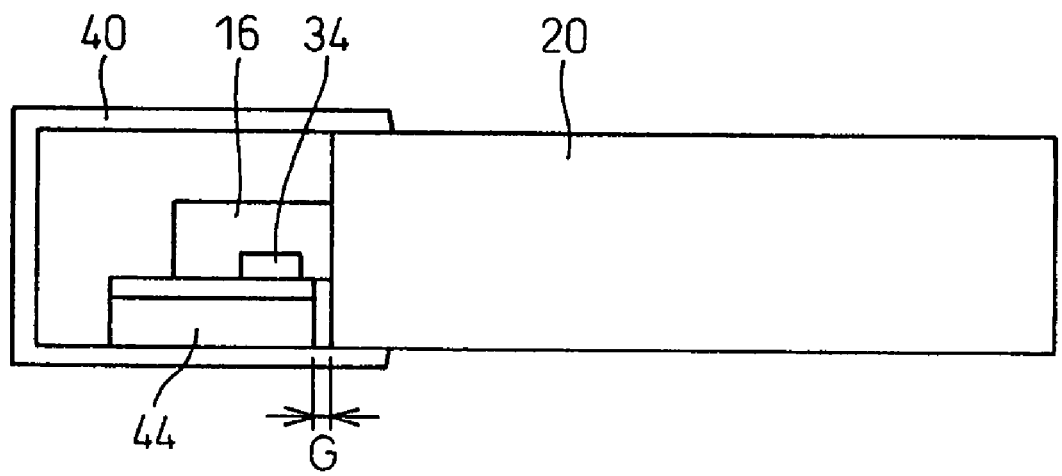
FIG. 28 is a view showing a backlight according to a further embodiment of the invention.

FIG. 28 shows a backlight according to a still further embodiment of the present invention. In this embodiment, the LEDs 16 are mounted in such a fashion that the light outgoing surfaces protrude forward, by the gap G, from the circuit substrate 36. The light guide plate 20 enters the LED housing 40. Accordingly, the light outgoing surface of the LED 16 can be more easily brought into close contact with the incidence surface of the light guide plate 20 and, hence, light can be introduced more efficiently into the light guide plate 20. Consequently, a brighter backlight can be provided.

Figure 29:
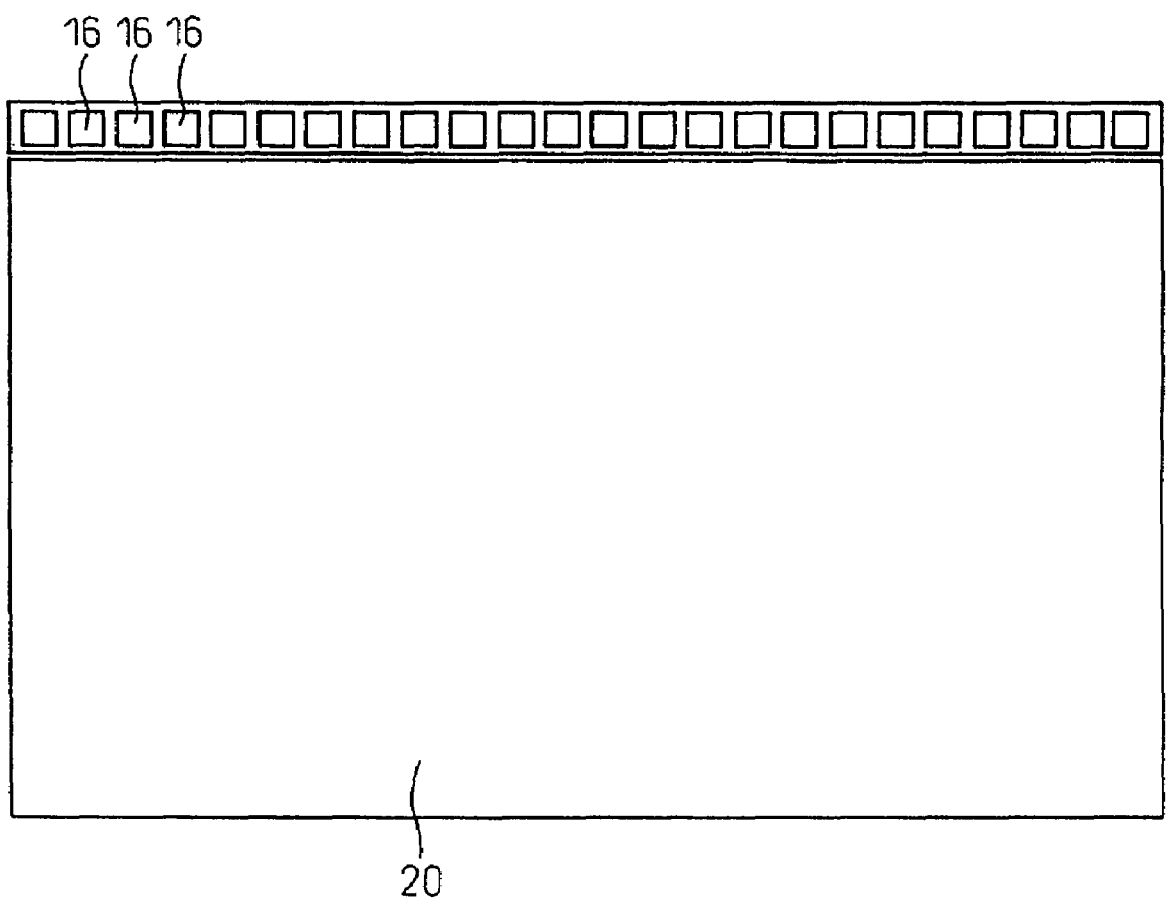
FIG. 29 is a view showing a backlight according to a further embodiment of the invention.
Figure 30:
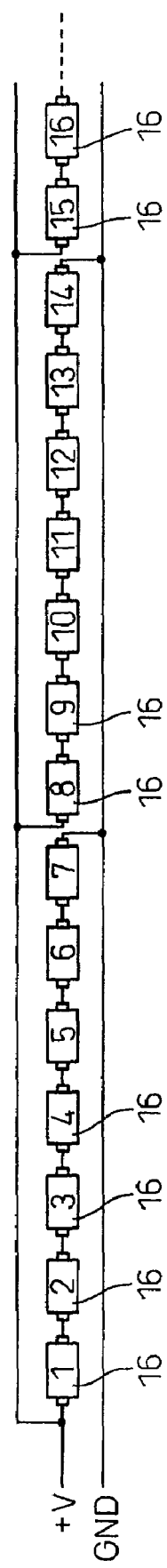
FIG. 30 is a view showing the electric connection of the LEDs shown in FIG. 29.

FIG. 29 shows a backlight according to a still further embodiment of the present invention. FIG. 30 shows an electric connection of the LEDs in FIG. 29. A plurality of LEDs 16 are arranged in a row at the light incidence surface of the light guide plate 20. The first to seventh LEDs 16 from the end of the row of the LEDs are connected in series as one LED group and the eighth to fourteenth LEDs are connected in series as a next LED group. Subsequent groups of the seven pieces of LEDs 16 are connected to one after another in series. The groups each containing the seven pieces of LEDs 6 connected in series are connected in parallel.

Therefore, when a driving voltage of one LED 16 is 3.5 V, the driving voltage of the entire LEDs 16 is 24.5 V. Assuming that the number of the LEDs 16 is 49 and all the LEDs 16 are connected in series, the driving voltage is 171.5 V. In this case, the driving power source unavoidably becomes a high voltage circuit and sizes and constructions of components become great. According to the construction of this embodiment, however, the driving voltage becomes lower and the power source can be easily rendered compact. The merit of this embodiment is not limited to the driving power source. Assuming that any one of the LEDs 16 becomes defective, only the group in which that LED 16 is connected in series becomes defective and the influence on the backlight can be reduced.

In the backlight according to this embodiment, M number of LEDs are arranged in the longitudinal direction of the light incidence surface of the light guide plate 20 and electrically connected so that there are a plurality of groups of LEDs with each group comprising N number of LEDs mutually adjacently arranged in series.

In this embodiment, seven LEDs 16 are connected in series as one group but this arrangement is not restrictive. A power source may be disposed independently in the unit of seven LEDs. The number of LEDs 16 in one group is preferably from 2 to 10.

Figure 31:
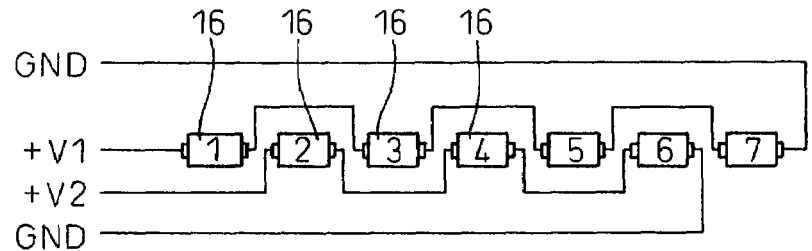
FIG. 31 is a view showing the electric connection of the LEDs in another embodiment.

FIG. 31 shows another electric connection of the LEDs. A plurality of LEDs 16 are arranged in a row as shown in FIG. 30. In FIG. 31, every other LED 16 is connected in series. In other words, the first, third, fifth and seventh LEDs 15 are connected in series, and the second, fourth and sixth LEDs 16 are connected in series. According to this circuit construction, even when a certain LED 16 becomes defective (open, for example), every other LED 16 is kept ON. Therefore, even though light power of the backlight drops to a half, non-uniformity of light power cannot be easily recognized.

In the drawing, every other LED 16 is shown connected in series, but an arbitrary number of LEDs may exist between the two LEDs connected electrically. In other words, in the backlight of this embodiment, M number of LEDs are arranged in the longitudinal direction of the light incidence surface of the light guide plate such that every S number of the LEDs from the end are electrically connected to each other (S: a positive integer). In this case, S is preferably from 1 to 10.

Figure 32:
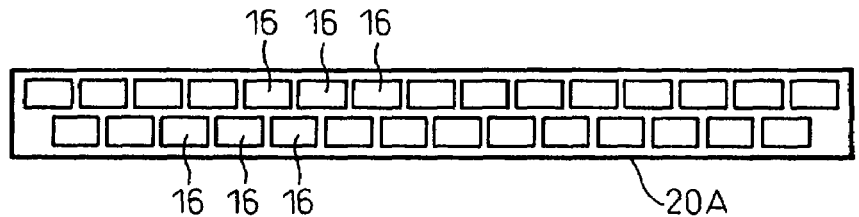
FIG. 32 is a view showing a backlight according to a further embodiment of the invention.
Figure 33:
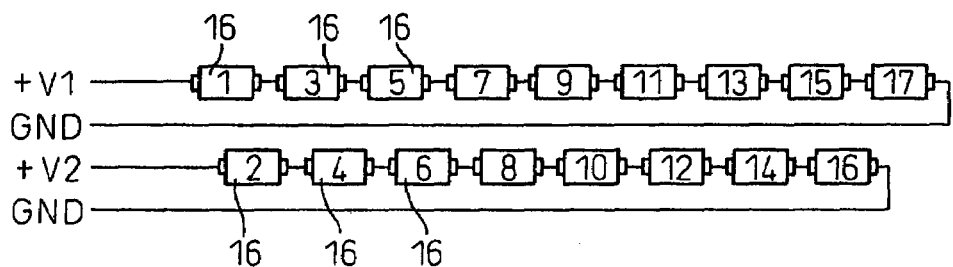
FIG. 33 is a view showing the electric connection of the LEDs shown in FIG. 32.

FIG. 32 shows a backlight according to a still further embodiment of the present invention. FIG. 33 shows electric connection of the LEDs shown in FIG. 32. In this embodiment, a plurality of LEDs 16 are arranged zigzag in two rows with respect to the thickness direction of the light incidence surface of the light guide plate 20 in such a fashion that the LEDs 16 of the lower row are positioned between the two LEDs 16 of the upper row. Odd numbers (1, 3, 5) are allocated to the LEDs 16 of the upper row and even numbers (2, 4, 6) are allocated to the LEDs 16 of the lower row. The LEDs 16 of each row are arranged in series. Therefore, even when any one of the LEDs 16 becomes defective, no influences are given on the LEDs 16 of the other row. Consequently, though light power of the backlight changes, non-uniformity of light power hardly occurs.

Figure 34:
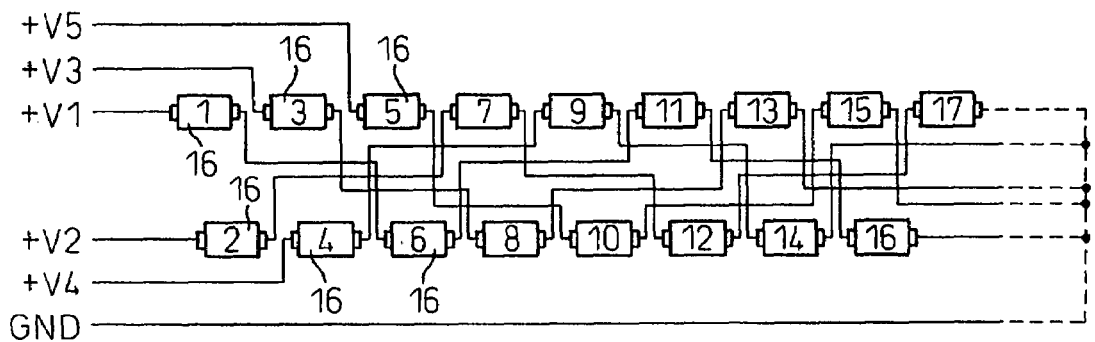
FIG. 34 is a view showing the electric connection of the LEDs in a further embodiment.

FIG. 34 shows another electric connection of the LEDs. A plurality of LEDs 16 are arranged in two staggered rows in the thickness direction of the light incidence surface of the light guide plate 20. Odd numbers (1, 3, 5) are allocated to the LEDs 16 of the upper row and even numbers (2, 4, 6) are allocated to the LEDs 16 of the lower row.

The LEDs 16 of the upper row and the LEDs 16 of the lower row are alternately connected to each other and moreover, with an interval of five LEDs 16. In other words, the first LED 16 and the sixth LED 16 are connected in series and the eleventh LED 16 and the sixteenth LED 16 are connected in series. This also holds true of other LEDs 16. Consequently, even when any one of the LEDs 16 becomes defective, non-uniformity of light power of the backlight can be hardly recognized. The LED driving voltage can be lowered and the power source can be made compact in size.

In the backlight according to this embodiment, a plurality of rows of the LEDs are arranged in the direction of a thickness of the light guide plate with each row of LEDs arranged in the longitudinal direction of the light incidence surface of the light guide plate, N number of LEDs being electrically connected LED in series in which the LED adjacent each other belong to different rows.

In all the embodiments explained above, the backlight can include at least one of the reflection sheet, the diffusion sheet and the lens sheet. Furthermore, as shown in FIG. 1, for example, a liquid crystal display device can be constituted by combining any one of the above described the backlights with a liquid crystal panel.

The invention claimed is:

1. A backlight device, comprising:
   a light guide plate having an upper surface configured to face a liquid crystal panel, a lower surface, and at least one side surface extending in a thickness direction between the upper surface and the lower surface; and
   a plurality of LEDs for irradiating light beams to the side surface of the light guide plate, which side surface serves as a light incidence surface,
   the plurality of LEDs being arranged in a plurality of rows in the thickness direction of the same side surface of the light guide plate so as to extend in a longitudinal direction of the light incidence surface,
   in the plurality of LEDs, two LEDs electrically connected to each other in series being disposed in different rows.

2. The backlight device as set forth in claim 1, wherein:
   in the plurality of rows, the plurality of LEDs are arranged in a staggered arrangement.

3. The backlight device as set forth in claim 1, further comprising:
   a plurality of LED groups each including not less than two LEDs electrically connected to each other in series,
   wherein:
   the LEDs in each of the LED groups are connected to each other in series such that the LEDs are disposed in the rows alternately.

* * * * *